United States Patent
Kishimoto et al.

(12)

(10) Patent No.: US 12,165,019 B2
(45) Date of Patent: Dec. 10, 2024

(54) SYMBOLIC MODEL TRAINING WITH ACTIVE LEARNING

(71) Applicant: International Business Machines Corporation, Armonk, NY (US)

(72) Inventors: Akihiro Kishimoto, Setagaya (JP); Masataro Asai, Charlestown, MA (US); Yufang Hou, Dublin (IE); Hiroshi Kajino, Tokyo (JP); Radu Marinescu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1007 days.

(21) Appl. No.: 17/132,776

(22) Filed: Dec. 23, 2020

(65) Prior Publication Data

US 2022/0198324 A1    Jun. 23, 2022

(51) Int. Cl.
*G06N 20/00* (2019.01)
*G06F 17/18* (2006.01)
*G06F 18/211* (2023.01)
*G06F 18/214* (2023.01)

(52) U.S. Cl.
CPC ............. *G06N 20/00* (2019.01); *G06F 17/18* (2013.01); *G06F 18/211* (2023.01); *G06F 18/214* (2023.01)

(58) Field of Classification Search
CPC ..... G06N 20/00; G06F 18/211; G06F 18/214; G06F 17/18; G06K 9/6228; G06K 9/6256
See application file for complete search history.

(56) References Cited

U.S. PATENT DOCUMENTS

| 2,020,017 | A | 11/1935 | Burgess |
| 9,740,978 | B2 | 8/2017 | Hassanzadeh et al. |
| 10,099,382 | B2 | 10/2018 | Hill |
| 10,154,756 | B2 | 12/2018 | Hall |
| 10,216,725 | B2 | 2/2019 | Tang |
| 10,552,749 | B2 | 2/2020 | Riabov et al. |

(Continued)

FOREIGN PATENT DOCUMENTS

CA    3046327 A1    6/2018

OTHER PUBLICATIONS

Reinaldo, Francisco Antonio Fernandes. Afranci: Multi-layer architecture for cognitive agents. Diss. Universidade do Porto (Portugal), 2010: i-177 (Year: 2010) (Year: 2010).*

(Continued)

*Primary Examiner* — Randall K. Baldwin
(74) *Attorney, Agent, or Firm* — Amin, Turocy & Watson, LLP

(57) ABSTRACT

Techniques regarding generating and/or training one or more symbolic models are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a training component that can train a symbolic model via active machine learning. The symbolic model can characterize a formal planning language for a planning domain as a plurality of digital image sequences.

20 Claims, 12 Drawing Sheets

(56) References Cited

U.S. PATENT DOCUMENTS

| | | |
|---|---|---|
| 10,556,348 B2 | 2/2020 | Stoyanchev |
| 10,789,755 B2 | 9/2020 | Amer et al. |
| 2015/0228004 A1 | 8/2015 | Bednarek et al. |
| 2018/0218475 A1 | 8/2018 | Riabov et al. |
| 2018/0285770 A1* | 10/2018 | Manikonda ............. G06F 40/35 |
| 2018/0307779 A1 | 10/2018 | Tellex |
| 2018/0314942 A1* | 11/2018 | Shinn ...................... A63F 13/00 |
| 2018/0314963 A1 | 11/2018 | Kovacs |
| 2019/0084151 A1 | 3/2019 | Bai |
| 2019/0197111 A1 | 6/2019 | Garrote |
| 2019/0197402 A1 | 6/2019 | Kovács |
| 2019/0228495 A1 | 7/2019 | Tremblay |
| 2019/0232489 A1 | 8/2019 | Pascanu |
| 2019/0366557 A1 | 12/2019 | Gewickey |
| 2019/0389060 A1 | 12/2019 | Roy Chaudhuri |
| 2020/0005162 A1 | 1/2020 | Kattepur |
| 2020/0030971 A1* | 1/2020 | Oleynik ..................... B25J 3/04 |
| 2020/0104769 A1 | 4/2020 | Bnayahu et al. |
| 2020/0122038 A1* | 4/2020 | Ebrahimi ............... G06N 3/045 |
| 2020/0122039 A1 | 4/2020 | Meuleau et al. |
| 2020/0174455 A1 | 6/2020 | Fox et al. |
| 2020/0257857 A1 | 8/2020 | Peper et al. |
| 2022/0126445 A1* | 4/2022 | Zhu ........................ B25J 9/1635 |

OTHER PUBLICATIONS

Chen, Tianshui, et al. "Neural task planning with and-or graph representations." IEEE Transactions on Multimedia 21.4 (2018): 1022-1034. (Year: 2018).*

Asai, Masataro. "Neural-Symbolic Descriptive Action Model from Images: The Search for STRIPS." arXiv preprint arXiv:1912.05492 (Dec. 11, 2019). (Year: 2019).*

Asai, Masataro. "Unsupervised Grounding of Plannable First-Order Logic Representation from Images." arXiv preprint arXiv:1902.08093 (Mar. 2019). (Year: 2019).*

Asai, Masataro, and Hiroshi Kajino. "Towards Stable Symbol Grounding with Zero-Suppressed State AutoEncoder." arXiv preprint arXiv:1903.11277 (Mar. 2019). (Year: 2019).*

Riley, Heather, and Mohan Sridharan. "Integrating non-monotonic logical reasoning and inductive learning with deep learning for explainable visual question answering." Frontiers in Robotics and AI 6 (2019): 125: 1-20 (Year: 2019).*

Asai, Masataro, and Christian Muise. "Learning neural-symbolic descriptive planning models via cube-space priors: The voyage home (to STRIPS)." arXiv preprint arXiv:2004.12850 (Aug. 2020). (Year: 2020).*

Kurutach, Thanard, et al. "Learning plannable representations with causal infogan." Advances in Neural Information Processing Systems 31 (2018). (Year: 2018).*

Non Final Office Action received for U.S. Appl. No. 17/035,777 dated Sep. 15, 2022, 61 pages.

Chiari "Generating Symbolic Domain Models From Multimodal Data" U.S. Appl. No. 17/035,777, filed Sep. 29, 2020, 45 pages.

Asai "Unsupervised grounding of planable first-order logic representation from images", arXiv:1902.08093v4 [cs.AI] Mar. 27, 2019, 9 pages.

Asai et al. "Towards Stable Symbol Grounding with Zero-Suppressed State AutoEncoder", arXiv:1903.11277v1 [cs.LG] Mar. 27, 2019, 9 pages.

Asai et al. "Classical Planning in Deep Latent Space: Bridging the Subsymbolic-Symbolic Boundary" arXiv:1705.00154v3 [cs.AI] Dec. 3, 2017, 26 pages.

Bonet et al. "Learning First-Order Symbolic Representations for Planning from the Structure of the State Space", 24th European Conference on Artificial Intelligence—ECAI 2020, 8 pages.

Miglani "NL to PDDL—One-Shot Learning of Planning Domains from Natural Language Process Manuals", to obtain the degree of Master of Science at the Delft University of Technology, to be defended publicly on Tuesday Aug. 27, 2019, 111 pages.

Hu et al. "Active Learning With Partial Feedback" ICLR 2019, 14 pages.

"Fast Downward home page" http://www.fast-downward.org/, Last Accessed Oct. 15, 2020, 2 pages.

Ames et al. "Learning Symbolic Representations for Planning with Parameterized Skills" 2018 IEEE/RSJ International Conference on Intelligent Robots and Systems (IROS) Madrid, Spain, Oct. 1-5, 2018, 8 pages.

Andreson et al. "Active Exploration for Learning Symbolic Representations" 31st Conference on Neural Information Processing Systems (NIPS 2017), Long Beach, CA, USA., 11 pages.

Asai "Neural-Symbolic Descriptive Action Model from Images: The Search for STRIPSI", arXiv:1912.05492v1 [cs.AI] Dec. 11, 2019, 10 pages.

Illanes et al. "Leveraging Symbolic Planning Models in Hierarchical Reinforcement Learning" KR2ML Workshop at NeurIPS 2019, Vancouver, Canada., 10 pages.

Luo et al. "Hierarchical Active Learning with Proportion Feedback on Regions", Mach Learn Knowl Discov Databases. 2019 ; 11052: 464-480. doi:10.1007/978-3-030-10928-8_28. 20 pages.

Konidaris et al. "Constructing Symbolic Representations for High-Level Planning", In AAAI (pp. 1932-1938), 9 pages, 2014.

Edelkamp, et al., "Introducing Dynamic Object Creation to PDDL Planning", https://openreview.net/forum?id=rkxRj58y5N, Last Accessed Dec. 9, 2020.

Feng, et al., "Extracting Action Sequences from Texts Based on Deep Reinforcement Learning", arXiv:1803.02632v2 [cs.AI] May 11, 2018, 7 pages.

Garrett, et al., "PDDLStream: Integrating Symbolic Planners and Blackbox Samplers via Optimistic Adaptive Planning", arXiv:1802.08705v5 [cs.AI] Mar. 23, 2020, 12 pages.

Kootbally, et al., "Towards robust assembly with knowledge representation for the planning domain definition language (PDDL)", Robotics and Computer-Integrated Manufacturing vol. 33, 2015, 14 pages.

Lindsay, et al., "Framer: Planning Models from Natural Language Action Descriptions", Proceedings of the Twenty-Seventh International Conference on Automated Planning and Scheduling (ICAPS 2017), pp. 434-442, <https://ioaoff.com/publication/2017/icaps/>, 9 pages.

Mell et al., "The NIST Definition of Cloud Computing", National Institute of Standards and Technology, Special Publication 800-145, Sep. 2011, 7 pages.

Srivastava, et al., "Using Classical Planners for Tasks with Continuous Operators in Robotics", Citeseerx, 9 pages, <https://citeseerx.ist.psu.edu/viewdoc/summary?doi=10.1.1.310.2334>, 2013.

Tatsubori, et al., "Design and Implementation of Linked Planning Domain Definition Language", arXiv:1912.07834v1 [cs.AI] Dec. 17, 2019, 17 pages.

"WikiHow: How-to instructions you can trust.", wikiHow, Last Accessed Dec. 9, 2020, 13 pages, <https://www.wikihow.com/Main-Page>.

Notice of Allowance received for U.S. Appl. No. 17/035,777 dated Feb. 9, 2023, 44 pages.

Github, "Kiting/verbnet-parser", Wikipedia, online available at <https://github.com/jgung/verbnet-parser>, retrieved on Jun. 10, 2024, 3 pages.

List of IBM Patents or Applications treated as related, Dec. 23, 2020.

* cited by examiner

SYMBOLIC MODEL TRAINING WITH ACTIVE LEARNING

BACKGROUND

The subject disclosure relates to the generation and training of symbolic models, and more specifically, to generating a symbolic model based on image data and training the symbolic model via active machine learning.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can regarding training a symbolic model representing one or more artificial intelligence ("AI") planning domain are described.

According to an embodiment, a system is provided. The system can comprise a memory that can store computer executable components. The system can also comprise a processor, operably coupled to the memory, and that can execute the computer executable components stored in the memory. The computer executable components can comprise a training component that can train a symbolic model via active machine learning. The symbolic model can characterize a formal planning language for a planning domain as a plurality of digital image sequences.

According to an embodiment, a computer-implemented method is provided. The computer-implemented method can comprise training, by a system operatively coupled to a processor, a symbolic model via active machine learning. The symbolic model can characterize a formal planning language for a planning domain as a plurality of digital image sequences.

According to an embodiment, a computer program product for enhancing an accuracy of a symbolic model is provided. The computer program product can comprise a computer readable storage medium having program instructions embodied therewith. The program instructions can be executable by a processor to cause the processor to train, by the processor, the symbolic model via active machine learning. The symbolic model can characterize a formal planning language for a planning domain as a plurality of digital image sequences.

DETAILED DESCRIPTION

Figure 1:
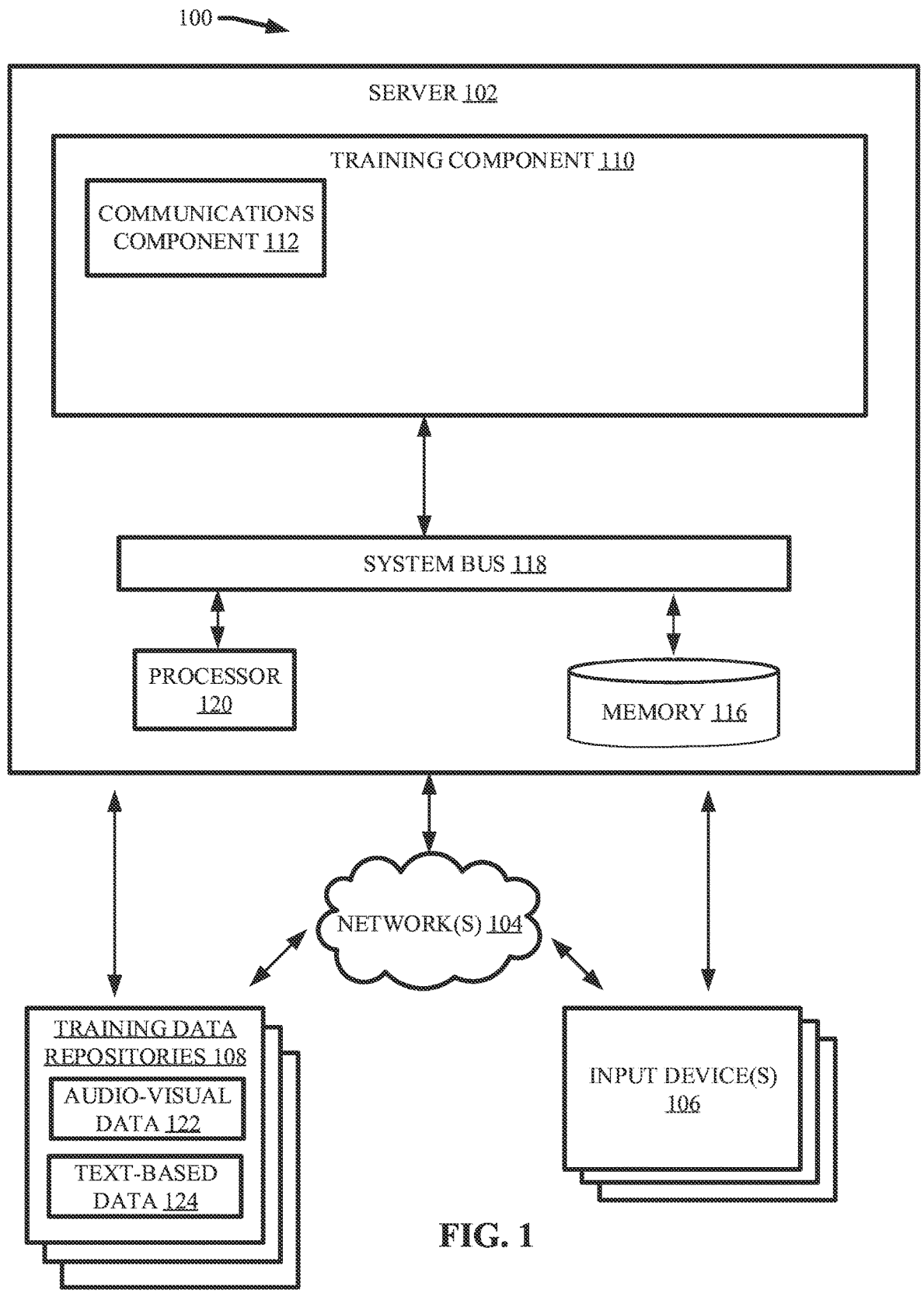
FIG. 1 illustrates a block diagram of an example, non-limiting system that can generate a symbolic model that characterizes one or more planning domains via a plurality of images and can train the model via active machine learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

AI planning is the task of finding a procedural course of action for a declaratively described system to reach a target goal while optimizing overall performance. The course of action can describe one or more transformations from an initial state to the goal state in accordance with one or more conditions and/or effects. AI planning has a wide range of applications, such as: robotics, autonomous systems, cognitive assistants, cyber security, and/or service composition. In AI planning, target domains are often represented as symbolic models formatted in formal planning language, such as planning domain definition language ("PDDL"). However, symbolic models are traditionally written manually by software developers, which has been a limiting factor for effective software development.

Various embodiments of the present invention can be directed to computer processing systems, computer-implemented methods, apparatus and/or computer program products that facilitate the efficient, effective, and autonomous (e.g., without direct human guidance) training of one or more symbolic models that can characterize a planning domain via a plurality of digital image sequences. For example, one or more embodiments described herein can generate one or more symbolic models based on training data comprising a plurality of images. Further, various embodiments described herein can generate one or more sample planning instances based on the symbolic models, which can be solved by a domain-independent planning system (e.g., a domain-independent planner). Additionally, active machine learning can be employed to effectively label planning instances as accurate or inaccurate. The results of the active machine learning can then be employed to update the training data, and thereby enhance the accuracy of the symbolic models.

The computer processing systems, computer-implemented methods, apparatus and/or computer program products employ hardware and/or software to solve problems that are highly technical in nature (e.g., training a symbolic model for a planning domain), that are not abstract and cannot be performed as a set of mental acts by a human. For example, an individual, or a plurality of individuals, cannot readily and/or efficiently process vast amounts of image data to generate a symbolic model that represents a planning domain as a plurality of digital image sequences.

Also, one or more embodiments described herein can constitute a technical improvement over conventional autonomously generated symbolic models by enhancing model accuracy via active machine learning. Additionally, various embodiments described herein can demonstrate a technical improvement over conventional autonomously generated symbolic models by representing the planning domain via a plurality of digital image sequences for active machine learning evaluations. For example, various embodiments described herein can present planning problem instances as a plurality of digital images represented unlabeled data to be labeled via active machine learning.

Further, one or more embodiments described herein can have a practical application by increasing the pool of labeled training data for training a symbolic model. For instance, various embodiments described herein can generate negative data samples to facilitate training one or more classifiers of the symbolic model. One or more embodiments described herein can control the presentation of plans generated based on the symbolic model. Thereby, the one or more embodiments can select likely to be inaccurate such that the active machine learning can identify negative data samples to further train the symbolic model, and thus enhance the accuracy of the symbolic model.

As used herein, the term "planning domain", and/or grammatical variants thereof, can refer to a domain model employed in AI based planning. In various embodiments, an AI planning domain can represent a sequence of actions to transition from an initial situation (e.g., an initial state) to a goal condition (e.g., a goal state) that completes a planning problem. For example, the planning domain can be characterized by associate actions to be implemented and/or operational arguments/conditions associated therewith.

FIG. 1 illustrates a block diagram of an example, non-limiting system 100 that can generate and/or train one or more symbolic models via active machine learning. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, and/or the like) can cause the machines to perform the operations described.

As shown in FIG. 1, the system 100 can comprise one or more servers 102, one or more networks 104, input devices 106, and/or training data repositories 108. The server 102 can comprise training component 110. The training component 110 can further comprise communications component 112. Also, the server 102 can comprise or otherwise be associated with at least one memory 116. The server 102 can further comprise a system bus 118 that can couple to various components such as, but not limited to, the training component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or training data repositories 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown, the training component 110 can be provided on the one or more servers 102, it should be appreciated that the architecture of system 100 is not so limited. For example, the training component 110, or one or more components of training component 110, can be located at another computer device (e.g., such as another server device, a client device, and/or the like).

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to evaluate one or more symbolic models generated by the model generator component 110 and/or enter training data (e.g., audio-visual data 122 and/or text-based data 124) into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In various embodiments, the one or more training data repositories 108 can include audio-visual data 122 (e.g., digital images data) and/or text-based data 124. The audio-visual data 122 and/or the text-based data 124 can describe, characterize, and/or represent one or more aspects and/or attributes of a target planning domain. In one or more embodiments, the training component 110 can generate and/or train one or more symbolic models representing the target planning domain based on the audio-visual data 122 and/or text-based data 124 included in the one or more training data repositories 108. In various embodiments, the text-based data 124 and/or audio-visual data 122 can be populated into the one or more training data repositories 108 manually and/or via one or more automated sources. For example, the text-based data 124 and/or audio-visual data 122 can be obtained from a variety of sources, including, but not limited to: cloud computing environments, AI systems, news feeds, databases (e.g., instructional material databases), multi-media teaching sources, a combination thereof, and/or the like.

The text-based data 124 can include, for example, one or more words, phrases, and/or sentences describing one or more situations to be address and/or represented by the target domain, and thereby the symbolic model generated by the training component 110. For instance, the text-based data 124 can include natural language descriptions of actions, preconditions, and/or goals to be implemented by one or more tasks of the target AI planning domain. Additionally, the audio-visual data 122 can include, for example, but not limited to: audio data, image data (e.g., digital images, single images, a collection of images), video data (e.g., digital recordings), a video segment, a slide show, a temporal image collection, a multi-media presentation, a combination thereof, and/or the like. For instance, the audio-visual data 122 can represent one or more states, preconditions, effects, and/or goals associated with one or more actions implemented by the one or more tasks of the target AI planning domain.

In one or more embodiments, the communications component 112 can manage communications between the one or more servers 102, input devices 106, and/or training data repositories 108. For example, the communications component 112 can receive training data (e.g., audio-visual data 122 and/or text-based data 124) from the one or more training data repositories 108 and/or evaluation data (e.g., characterizing the accuracy of one or more plans of a symbolic model) from the one or more input devices 106, and share the training data and/or evaluation data with the associated components of the server 102 (e.g., with the training component 110). Likewise, the communications component 112 can transmit one or more outputs (e.g., symbolic model plans, evaluation requests, a combination thereof and/or the like) of the training component 110 to the one or more input devices 106.

Figure 2:
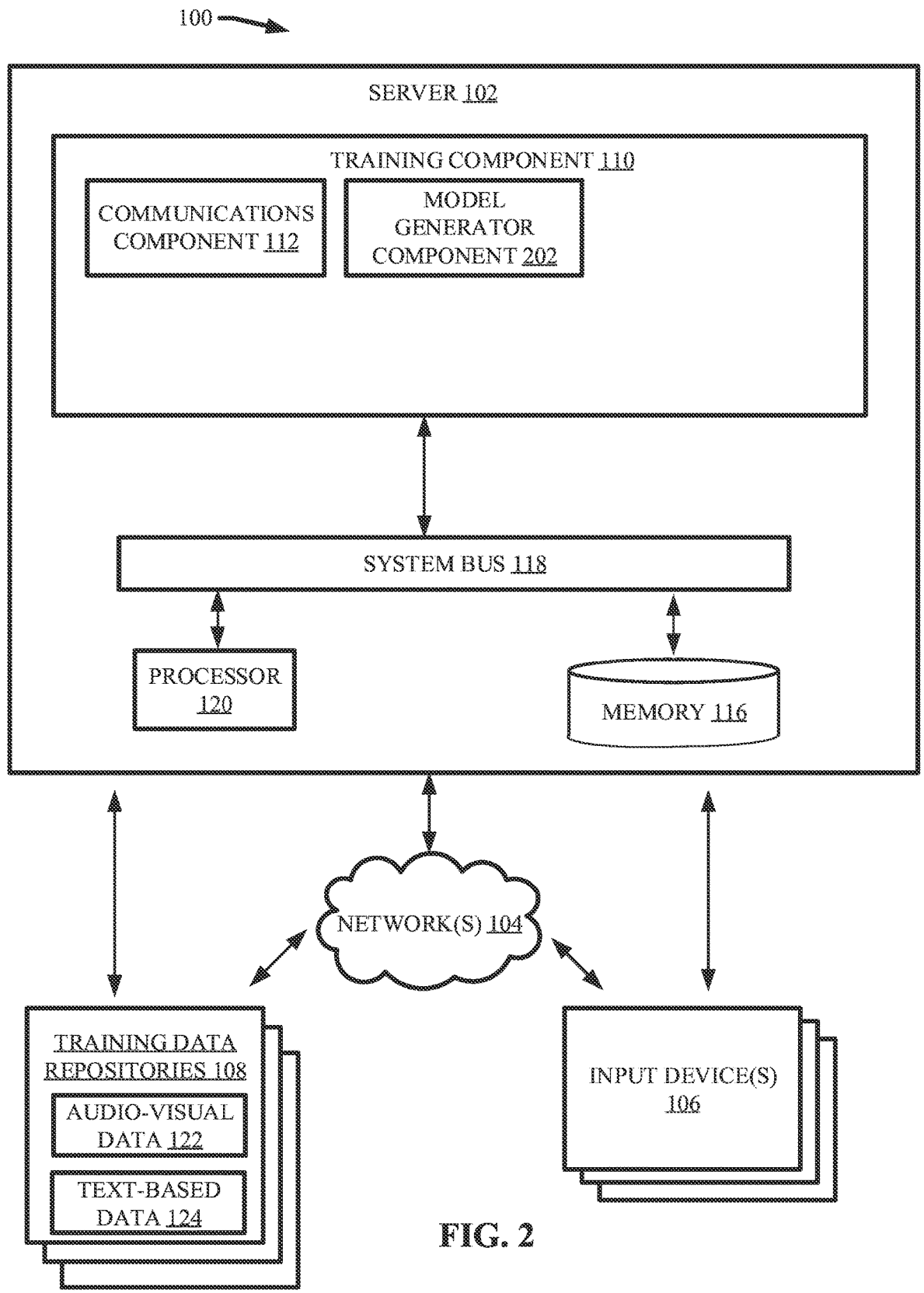
FIG. 2 illustrates a block diagram of an example, non-limiting system that can generate one or more symbolic models characterize one or more planning domains via pairs of digital images in accordance with one or more embodiments described herein.

FIG. 2 illustrates a diagram of the example, non-limiting system 100 further comprising model generator component 202 in accordance with one or more embodiments described herein. Repetitive description of like elements employed in other embodiments described herein is omitted for sake of brevity. In various embodiments, the model generator component 202 can generate one or more symbolic models that can characterize a planning domain as a plurality of digital image sequences based on the audio-visual data 122 and/or text-based data 124. For instance, the planning domain can be formatted in a formal AI planning domain language, such as the Planning Domain Definition Language ("PDDL"). Further, the planning domain can be represented by a plurality of digital image sequences within the one or more symbolic models.

In one or more embodiments, the model generator component 202 can generate the one or more symbolic models based on the audio-visual data 122 of a training data repository 108 associated with the target planning domain. For example, the model generator component 202 can analyze the audio-visual data 122 as one or more tuples describing a pair of digital images from the audio-visual data 122 in the context of a predecessor or successor relationship. For instance, the audio-visual data 122 can include one or more tuples characterized as <P, Q, b>; where "P" can represent a first digital image, "Q" can represent a second digital image, and "b" can represent a tertiary value. In various embodiments, the tertiary value "b" can have a first value (e.g., 1) when the second image "Q" is a successor state of the first image "P". For instance, tuples with the first tertiary value (e.g., "b=1") can be labelled as true digital image sequences. The tertiary value "b" can have a second value (e.g., 0) when the second image "q" is not a successor state of the first image "P". Also, the tertiary value "b" can have a third value (e.g., "?") when it is unknown whether the second image "Q" is a successor state of the first image "P". For instance, tuples with the third tertiary value (e.g., "b=?") can be unlabeled digital image sequences.

In various embodiments, the audio-visual data 122 can comprise examples of true digital image sequences. For example, the audio-visual data 122 can comprise a video, where each frame of the video can be a respective digital image and the inherent arrangement of the frames within the video can delineate successorship between the respective digital images. For instance, the audio-visual data 122 can comprise a digital video that visualizes a plan for performing one or more tasks of the planning domain. The digital video can be analyzed in chronological order to characterize the digital video as a plurality of tuples representing true digital image sequences. Additionally, the model generator component 202 can employ image recognition models and/or associated deep learning algorithms in one or more embodiments to define true digital image sequences from one or more collections of digital images within the audio-visual data 122. In one or more embodiments, the model generator component 202 can further generate examples of unlabeled digital image sequences via random sampling of the audio-visual data 122. For example, the model generator component 202 can randomly sample frames from a digital video outside the frames' chronological order.

Thereby, the model generator component 202 can generate and/or populate three or more training datasets from the audio-visual data 122. For example, the model generator component 202 can populate a first training dataset with the example true digital image sequence tuples, and a second training dataset with the example unlabeled digital image sequence tuples. The third dataset can be reserved for examples of false digital image sequences. The third dataset can initially be empty and then populated via one or more active machine learning protocols further described herein in accordance with one or more embodiments. For example, examples of one or more false digital image sequences can be identified by one or more users of the system 100 and subsequently populated into the third training dataset to further train a symbolic model.

In various embodiments, the model generator component 202 can further employ discrete representation learning to convert the digital image pairs "P,Q" of the training datasets into discrete symbolic states. For example, the model generator component 202 can prepare a state autoencoder ("SAE") and/or an action autoencoder ("AAE"), both of which can be represented by one or more neural networks. In various embodiments, the SAE can learn one or more encodings of one or more digital images associated to a state in a symbolic model. Further, as in a variational autoencoder ("VAE"), by preparing and training a state decoder, a state in a symbolic model can be decoded back to the one or more digital images. Thereby, the model generator component 202 can represent states in the formal AI planning domain language (e.g., PDDL) as digital image sequences (e.g., pairs of digital image sequences, such as pairs of first digital images and second digital images).

Further, the model generator component 202 can predict the probability of a pair of digital images "P,Q" having the first tertiary value (e.g., "b=1") from the three training datasets. For example, the three training datasets can comprise positive data (e.g., true digital image sequences), negative data (e.g., false digital image sequences), and unlabeled data. Initially, the model generator component 202 can employ a semi-supervised classification algorithm that utilizes classification from positive and unlabeled data ("PU classification") to train a classifier from positive and unlabeled data without negative data. As the third training dataset is populated with negative data (e.g., false digital image sequence examples), the model generator component 202 can employ additional classification algorithms such as, for example: PN classification (e.g., a supervised classification that trains a classifier using labeled data (e.g., positive and negative data)) and/or NU classification (e.g., a mirror of PU classification using negative and unlabeled data to train a classifier). Further, the model generator component 202 can utilized semi-supervised classification based on PN, PU, and NU class classification such as PUNU classification and/or PNU classification to train a classifier. In one or more embodiments, the model generator component 202 can employ PNU classification to predict the probability that the tertiary value of a tuple is equal to the first value (e.g., "b=1") from the three training datasets.

Figure 3:
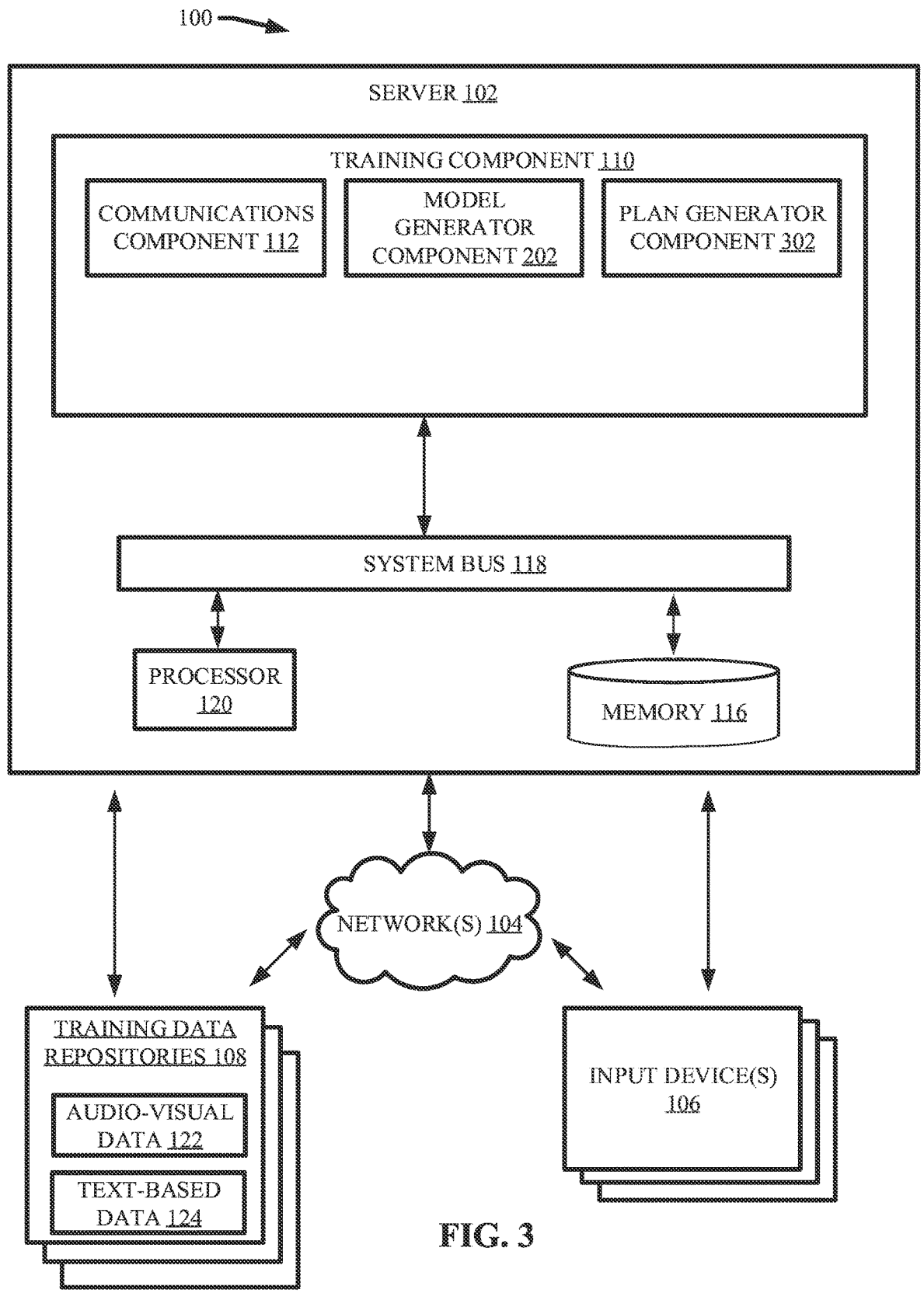
FIG. 3 illustrates a block diagram of an example, non-limiting system that can generate one or more plans associate with a planning problem instance based on one or more symbolic models in accordance with one or more embodiments described herein.

FIG. 3 illustrates a diagram of the example, non-limiting system 100 further comprising plan generator component 302 in accordance with one or more embodiments described herein. Repetitive description of like elements employed in other embodiments described herein is omitted for sake of brevity. In various embodiments, the plan generator component 302 can generate one or more plans based on the symbolic model generated by the model generator component 202. The one or more plans can define an order of actions represented by the digital image sequences to complete a task of the AI planning domain. For example, a plan generated by the plan generator component 302 can include one or more digital image sequences and associate actions that define the transition from an initial state to a goal state in the AI planning domain.

In one or more embodiments, the plan generator component 302 can receive a symbolic action schema (e.g., characterized by "$\{A_1, A_2, \ldots A_N\}$") and an image "$S_0$" representing an initial state of the AI planning domain. The action schema can comprise one or more actions "A" that can be implemented to transition from a first state in the AI planning domain to a second state in the AI planning domain, where each state can be represented by a digital image in the one or more plans generated by the plan generator component 302. For example, an action can delineate the transition between digital images in a given digital image sequence.

In various embodiments, the symbolic action schema can be included in the text-based data 124 of the training data repository 108 and/or can be generated by one or more AI systems. For example, in one or more embodiments the symbolic action schema can be based on the aforementioned action model. Further the symbolic action schema can comprise actions characterized by one or more parameters (e.g., objects that need to be present to implement the action), preconditions (e.g., conditions to be satisfied before the action can be performed), and/or effects (e.g., one or more sets of conditions that can be modified when the associated action is applied). In one or more embodiments, the initial state image "$S_0$" can be specified via the one or more input devices 106 and/or can be obtained by the plan generator component 302 via one or more random samplings.

In one or more embodiments, the plan generator component 302 can generate a plurality of plans by random sampling actions from the symbolic action schema and applying the actions to unlabeled data examples from the second training dataset. In various embodiments, the plan generator component 302 can employ one or more domain-independent planners (e.g., LatPlan and/or Fast Downward) to calculate the plurality of plans. Each of the plans can define an order of actions associated with a planning problem instance. For example, the plans can define an order of actions that attempt to achieve a goal state from an initial state, where the actions can result in one or more intermediate states. As described herein, the initial state, one or more intermediate states, and/or goal state can be represented by one or more digital images from the audio-visual data 122. Given the initial state and a goal, determining a plan can be addressed by a heuristic search that is incorporated into one or more domain-independent planners.

In various embodiments, the one or more plans can comprise a plurality of digital image sequences from the first and/or second training datasets. For instance, the one or more plans can comprise a plurality of digital image sequences formed from one or more true digital image sequences and/or unlabeled digital image sequences. The plan generator component 302 can be generate a plurality of plans to achieve a common goal state. Additionally, the plan generator component 302 can generate a plurality of plans, where a first set of one or more plans attempt to achieve a first goal state and or more other sets of plans attempt to achieve one or more other goal states.

Figure 4:
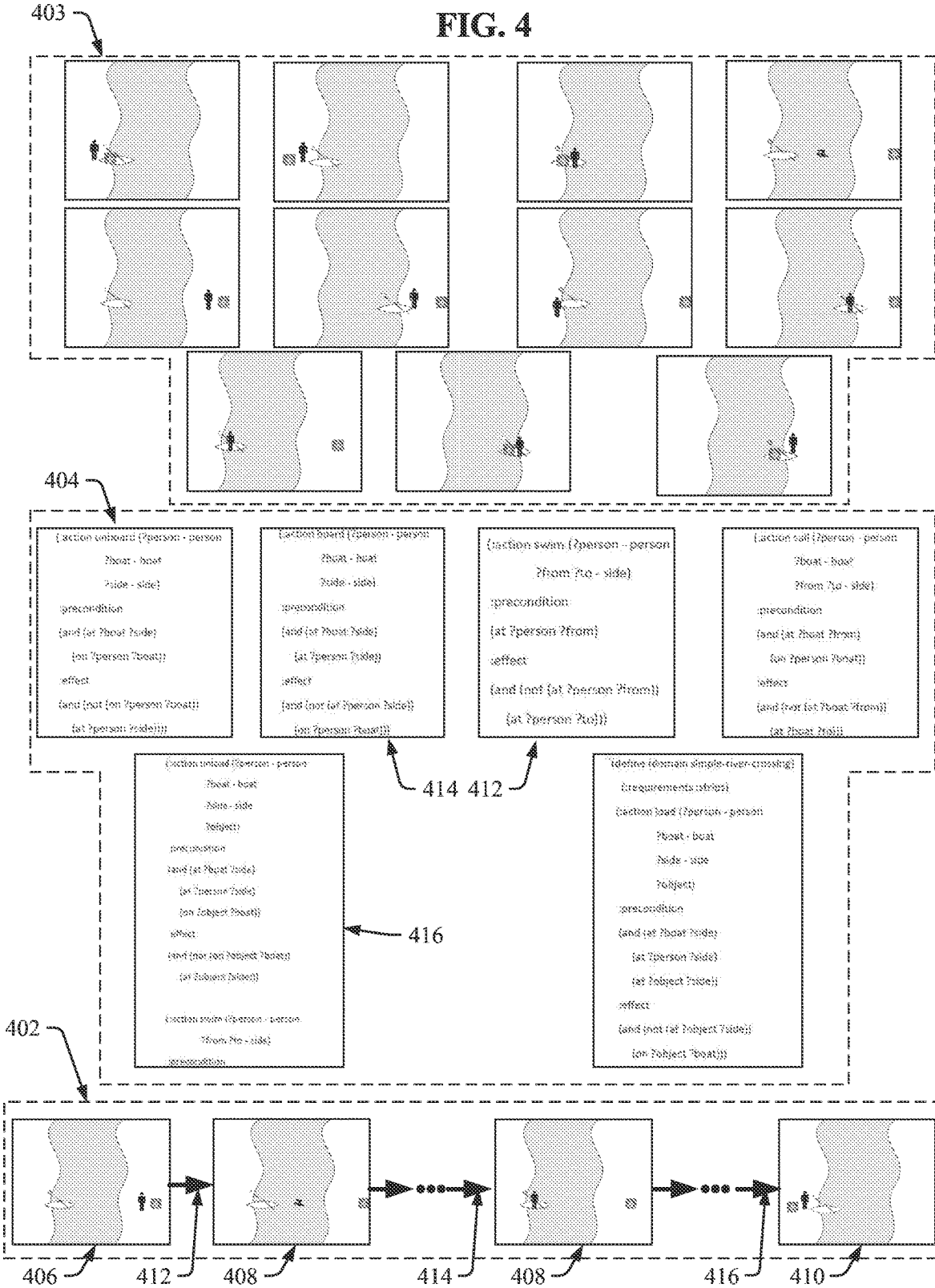
FIG. 4 illustrates a diagram of an example, non-limiting plan that can be generated based one or more symbolic models in accordance with one or more embodiments described herein.

FIG. 4 illustrates a diagram of a non-limiting, exemplary plan 402 that can be generated by the plan generator component 302 in accordance with one or more embodiments described herein. Repetitive description of like elements employed in other embodiments described herein is omitted for sake of brevity. The exemplary plan 402 can be generated based on one or more exemplary digital images 403 included in the audio-visual data 122 and/or an exemplary symbolic action schema 404. As shown in FIG. 4, the audio-visual data 122 can comprise a collection of digital images 403. In various embodiments, the exemplar digital images 403 can be comprised within one or more tuples of the symbolic model generated by the model generator component 202. For example, the plan generator component 302 can generate one or more plans based on the one or more tuples generated by the model generator component 202, which can include one or more images (e.g., such as exemplary digital images 403). Further, the exemplary symbolic action schema 404 can include one or more actions and associate preconditions, and/or effects (e.g., formatted in PDDL), as shown in FIG. 4.

The plan generator component 302 can generate the exemplary plan 402, which can include an order of actions defining a transition from an initial state 406 to a goal state 408 via one or more intermediate states 410. As shown in FIG. 4, each state can be represented by one or more of the exemplary digital images 403.

For example, the exemplary plan 402 depicted in FIG. 4 regards a river crossing problem, where the object is to transport one or more items from one side of a river to another side of the river. The one or more plans generated by the plan generator component 302 (e.g., exemplary plan 402) can characterize a sequence of actions associated with the planning problem instance. For instance, with regards to the river crossing problem, the exemplary plan 402 can characterize a sequence of actions for accomplishing the item transportation. The first state in the exemplary plan 402 can be the initial state 406, and the last state in the exemplary plan 402 can be the goal state 408. The goal state 408 can characterize a completion of the planning problem. For example, with regards to the river crossing problem, the goal state 408 can characterize the one or more items being located on the desired riverbank. One or more actions included in the plans (e.g., exemplary plan 402) can be employed to achieve one or more intermediate states 410 and/or facilitate the transition from the initial state 406 to the goal state 408.

The plan generator 302 can generate a plurality of plans 402 that include respective action sequences for transitioning from the initial state 406 to the goal state 408. For instance, the exemplary plan 402 shown in FIG. 4 depicts two intermediate states 410; however, the exemplary plan 402 can further include additional intermediate states 410 (e.g., represented by the three black dot pattern). The action sequence order, and thereby the order of the intermediate states 410 can vary between plans generated by the plan generator component 402. As shown in FIG. 4, the exemplary plan 402 can include a first action 412 (e.g., the "action swim" defined in the exemplary symbolic action schema 404) to transition from the initial state 406 to a first intermediate state 410. Further, the exemplary plan 402 can include a second action 414 (e.g., "action board" defined in the exemplary symbolic action schema 404) to transition from one intermediate state 410 to another. Moreover, the exemplary plan 402 can subsequently include a third action 416 (e.g., "action unload" defined in the exemplary symbolic action schema 404) to transition from an intermediate state 410 to the goal state 408.

In one or more embodiments, the order of actions can be based on tuples labelled true (e.g., "b=1") and/or unlabeled tuples (e.g., "b=?"). Thus, one or more action sequences included in the one or more plans can be an inaccurate and thereby represented by a false digital image sequence. An inaccurate action sequence can fail to result in one or more of the proposed intermediate states 410 and/or can fail to achieve the goal state 408. In various embodiments, inaccurate action sequences represented by false digital image sequences can be identified and/or labelled via one or more active machine learning protocols.

Figure 5:
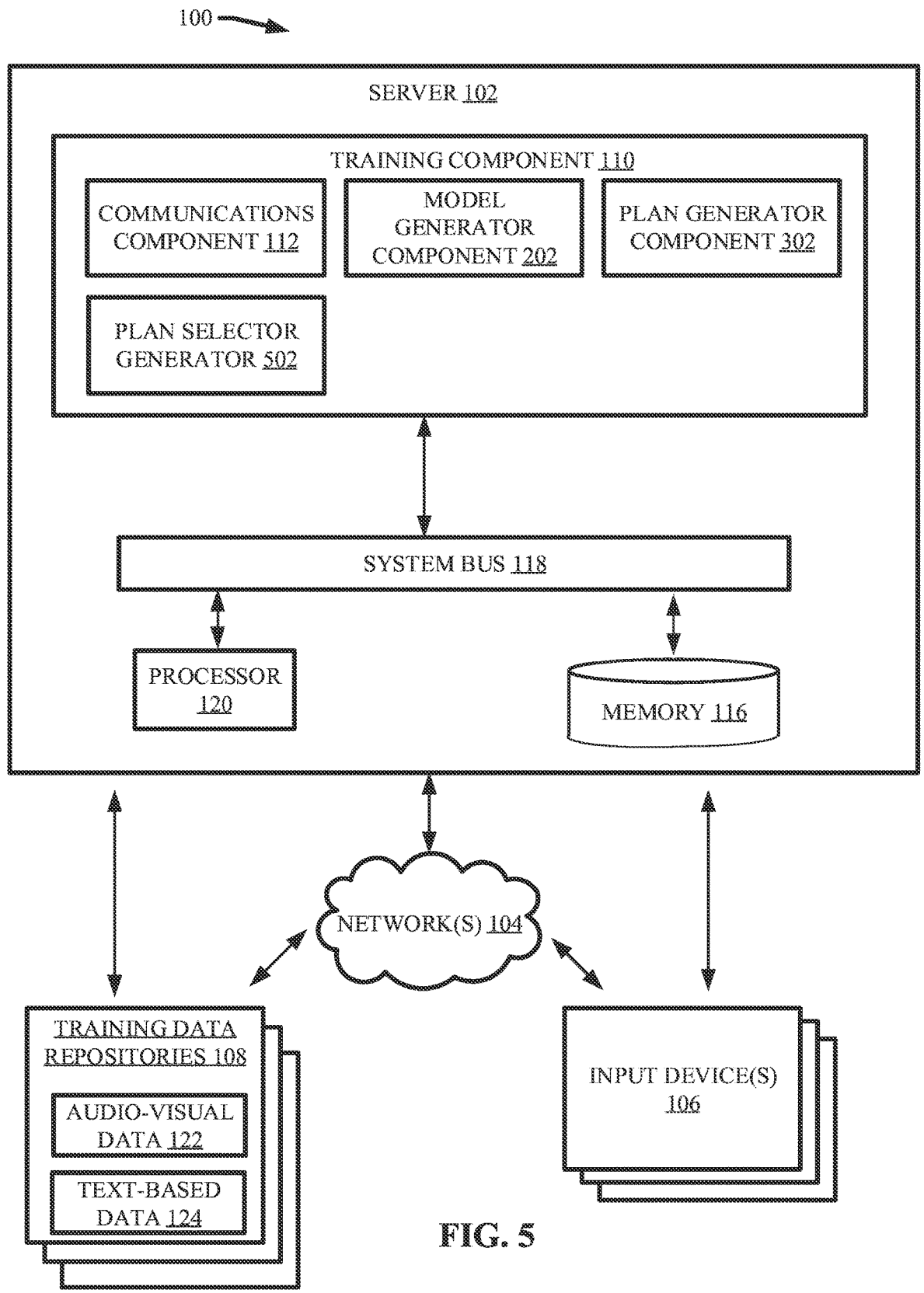
FIG. 5 illustrates a block diagram of an example, non-limiting system that can select one or more plans generated based on one or more symbolic models characterizing a planning domain in accordance with one or more embodiments described herein.

FIG. 5 illustrates a diagram of the example, non-limiting system 100 further comprising plan selector component 502 in accordance with one or more embodiments described herein. Repetitive description of like elements employed in other embodiments described herein is omitted for sake of brevity. In various embodiments, the plan selector component 502 can select one or more plans from the plurality of generated plans for validation via one or more active machine learning protocols.

In one or more embodiments, the plan selector component 502 can select one or more plans from the plurality of generated plans based on the probability that the selected plans include one or more unlabeled digital image sequences that are actually false digital image sequences. For example, the plan selector component 502 can select plans that are most likely to contain one or more false digital image sequences. For instance, the probability of an action can be the probability that the action applied at the state represented by image "P" to generate a successor state represented by image "Q" is correct (e.g., b=1), as learned by the aforementioned PNU learning employed by the model generator component 202. In one or more embodiments, the plan selector component 502 can define the probability of a generated plan being accurate (e.g., including all true digital image sequences) as a multiplication of the probabilities of actions included in the given plan (e.g., action sequences) being accurate (e.g., being associated with a true digital image sequence), and select plans with low probabilities (e.g., select plans that are expected to include incorrect action sequences).

Further, the one or more selected plans can be evaluated via active machine learning, where a user of the system 100 can be queried to label the digital image sequences of the plan. For example, the plan selector component 502 can generate one or more evaluation requests that query a user of the system 100 to label one or more of the digital image sequences comprised within the one or more selected plans. Additionally, the plan selector component 502 can present the one or more selected plans and/or evaluation requests to one or more system 100 users via the one or more input devices 106. In one or more embodiments, the one or more evaluation requests can query the user to identify and/or label false digital image sequences included in the one or more selected plans. For example, the user can be queried to label a digital image sequence as false when the order of actions (e.g., characterized by states represented by digital images) would not achieve the target goal state. Digital image sequences not labeled false by the user can be assumed to be true digital image sequences.

Through the active machine learning, the user can employ the one or more input devices 106 to label previously unlabeled digital image sequences. Further, the digital image sequences presented to the user for evaluation can include the plans with the highest probability of including inaccuracies (e.g., negative data as false digital image sequences). Thereby, the active machine learning can generate false digital image sequence examples.

Figure 6:
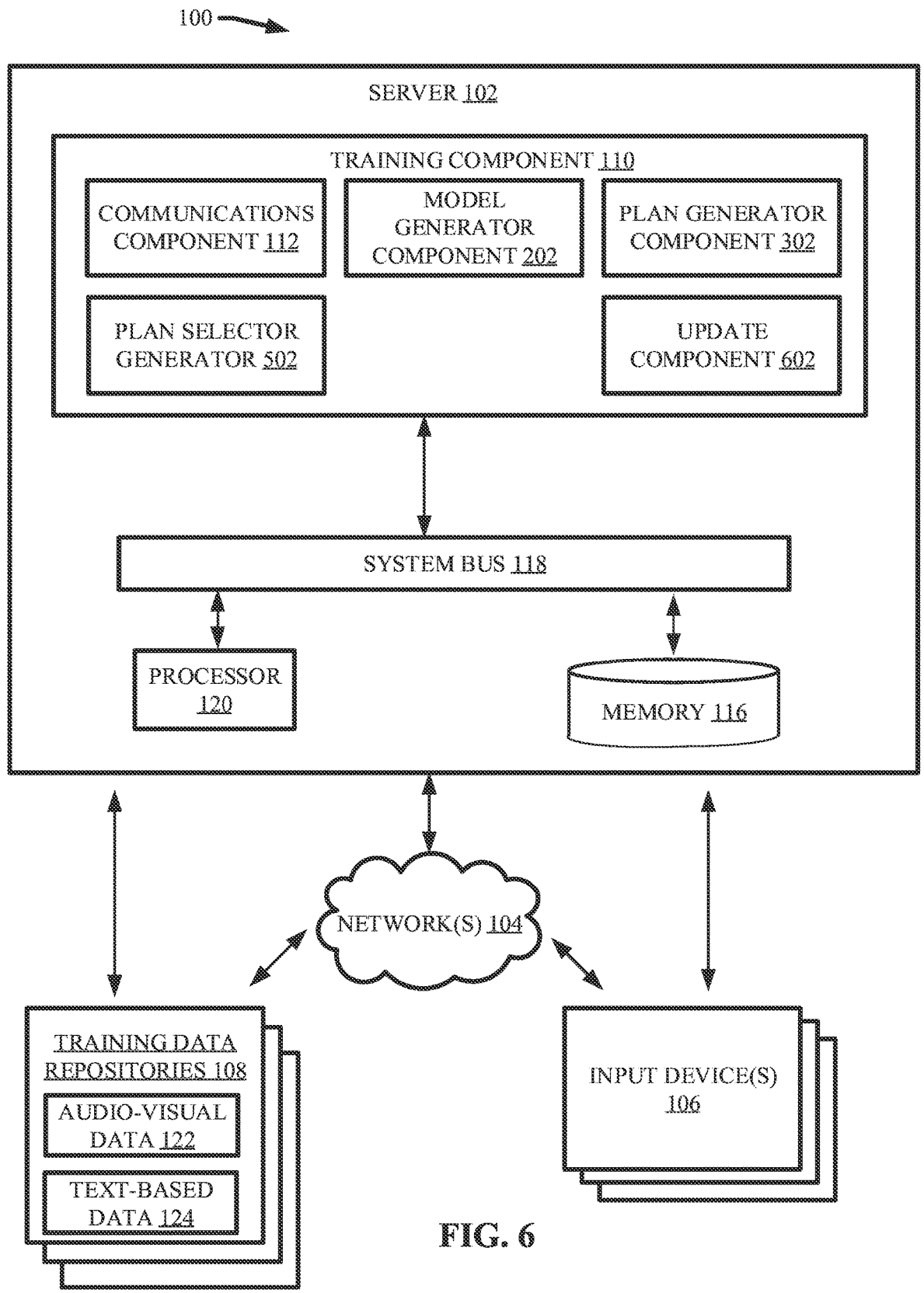
FIG. 6 illustrates a block diagram of an example, non-limiting system that can update training data for one or more symbolic models based on one or more active machine learning protocols in accordance with one or more embodiments described herein.

FIG. 6 illustrates a diagram of the example, non-limiting system 100 further comprising update component 602 in accordance with one or more embodiments described herein. Repetitive description of like elements employed in other embodiments described herein is omitted for sake of brevity. In one or more embodiments, the update component 602 can update the training datasets based on the active machine learning.

In various embodiments, the active machine learning can identify one or more false digital image sequences from the plans selected for evaluation. Once labeled as false by the user, the update component 602 can populate the negative data into the third training dataset. Likewise, the active machine learning can identify one or more true digital image sequences from the plans selected for evaluation. Once the labeled as true by the user (e.g., via direct labeling or the absence of a false labeling), the update component 602 can populate the positive data into the first training dataset. Thereby, unlabeled digital image sequences can be included in the generated plans and presented to the user for evaluation in the context of a planning problem instance represented by a plurality of images. Whereupon the active machine learning can label the unlabeled digital image sequences as positive or negative training data.

In one or more embodiments, the model generator component 202 can be trained on the updated training datasets to enhance the accuracy of the generated symbolic models. For example, as more unlabeled digital image sequences are identified as false digital image sequences via the active machine learning, the increase in negative data samples can enhance the accuracy of the PNU classifications learned by the model generator component 202. For instance, the increased number of positive and negative samples can more accurately train the classifier.

Figure 7:
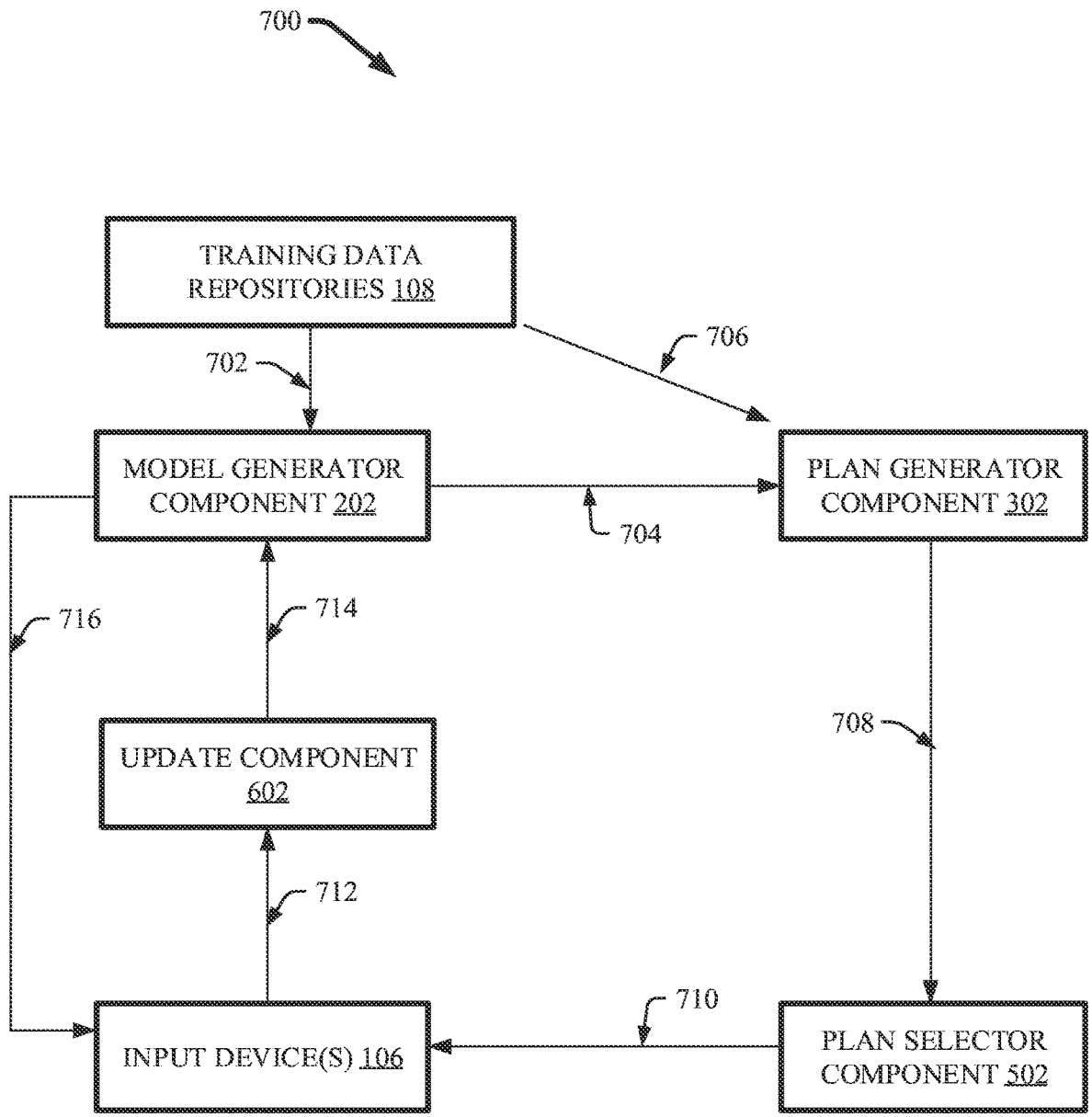
FIG. 7 illustrates a block diagram of an example, non-limiting communications scheme that can be implemented by a system that can generate and/or train symbolic models that characterize one or more planning domains in accordance with one or more embodiments described herein.

FIG. 7 illustrates a diagram of an example, non-limiting communication scheme 700 that can be implemented by the system 100 in accordance with one or more embodiments described herein. Repetitive description of like elements employed in other embodiments described herein is omitted for sake of brevity. In various embodiments, the communication scheme 700 can be employed via one or more direct electrical connections, networks 104, and/or cloud computing environments between the various devices and/or components of the system 100.

At 702, the one or more training data repositories 108 can share audio-visual data 122 with the model generator component 202. For example, the model generator component 202 can utilize the audio-visual data 122 as training data to generate one or more symbolic models in accordance with the various embodiments described herein. At 704, the model generator component 202 can share the one or more symbolic models with the plan generator component 302. Additionally, at 706 the one or more training data repositories 108 can share audio-visual data 122 and/or text-based data 124 with the plan generator component 302. For example, the one or more training data repositories 108 can share one or more symbolic action schema with the plan generator component 302 at 706. The plan generator component 302 can generate one or more plans based on the one or more symbolic models and/or symbolic action schema in accordance with various embodiments described herein.

At 708, the plan generator component 302 can share the one or more generated plans with the plan selector component 502. The plan selector component 502 can select one or more of the plans for labeling via one or more active machine learning protocols. For example, the plan selector component 502 can select one or more plans with a high likelihood of having inaccuracies. At 710, the one or more selected plans can be shared with the one or more input devices 106. In various embodiments, a user of the system 100 can employ the one or more input devices 106 to evaluate the one or more selected plans for inaccuracies. For example, the one or more input devices 106 can be employed to query one or more users to label one or more false digital image sequences included in the selected plans to identify negative data samples.

At 712, the data labels resulting from the active machine learning can be shared with the update component 602. For example, the update component 602 can populate training datasets with the newly labeled data resulting from the active machine learning. For instance, the update component 602 can populate one or more training datasets with digital image sequences labeled as false (e.g., negative data samples) by the one or more users via the active machine learning. At 714, the one or more updated training datasets can be shared with the model generator component 202, which can generate one or more updated symbolic models based on the update training datasets. For example, the updated training datasets can include more labeled data samples (e.g., more negative data samples) than the initial training data; thereby, the updated symbolic models can exhibit enhanced accuracy, as compared to the initial symbolic models previously shared with the plan generator. In various embodiments, the generation and/or training of symbolic models via communication steps 702-714 can repeat a plurality of times to achieve a desired amount of model accuracy. At 716, the one or more enhanced symbolic models can be shared with the one or more input devices 106 for presentation to the one or more users of the system 100. Thereby, the system 100 can generate one or more autonomously generated symbolic models with enhanced accuracy via active machine learning.

Figure 8:
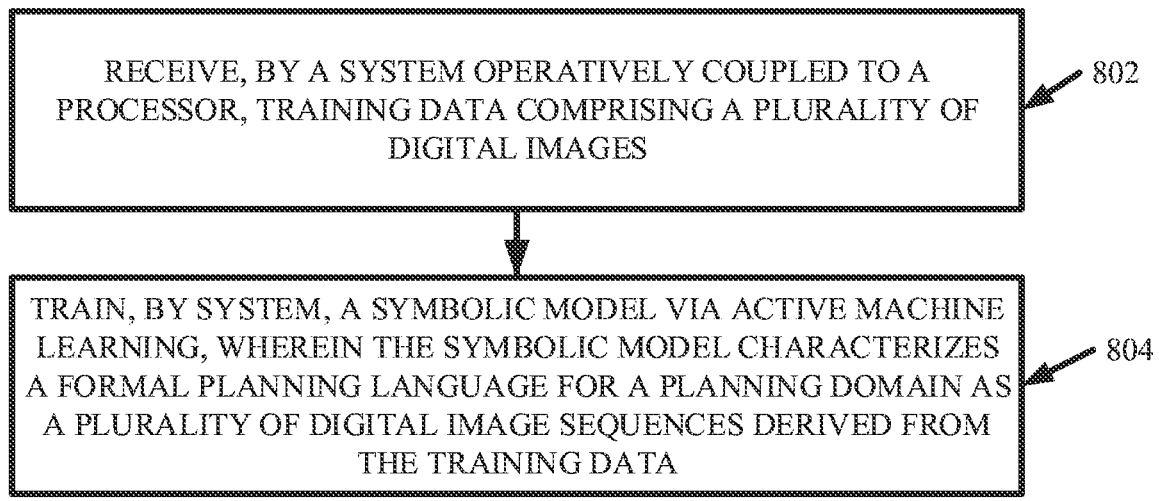
FIG. 8 illustrates a flow diagram of an example, non-limiting computer-implemented method that can facilitate the generation and/or training of one or more symbolic models that can characterize one or more planning domains in accordance with one or more embodiments described herein.

FIG. 8 illustrates a flow diagram of an example, non-limiting computer-implemented method 800 that can facilitate autonomous generation and/or training of one or more symbolic models via active machine learning in accordance with one or more embodiments described herein. Repetitive description of like elements employed in other embodiments described herein is omitted for sake of brevity.

At 802, the computer-implemented method 800 can comprise receiving (e.g., via communications component 112), by a system 100 operatively coupled to a processor 120, training data comprising a plurality of digital images. For example, the model generator component 202 can receive audio-visual data 122 from the one or more training data repositories 108 via one or more networks 104 in accordance with various embodiments described herein. In various embodiments, the training data received at 802 can include a video and/or a collection of digital images.

At 804, the computer-implemented method 800 can comprising training (e.g., via training component 110), by the system 100, one or more symbolic models via active machine learning, where the one or more symbolic models can characterize a formal planning language (e.g., PDDL) for a planning domain as a plurality of digital image sequences derived from the training data. For example, the one or more symbolic models can be generated by the model generator component 202 based one or more digital image sequences characterized by tuples, where a tertiary value of the tuple can describe a successor relationship between the digital images. In various embodiments, the one or more symbolic models can be employed to generate one or more plans characterizing a planning problem instance. Further, the plans can represent respective states of a transformation from an initial state to a goal state via digital images from the training data. As described herein, the one or more plans can be evaluated via active machine learning to label digital image sequences included in the plans and thereby generate negate data samples for the training at 804.

Figure 9:
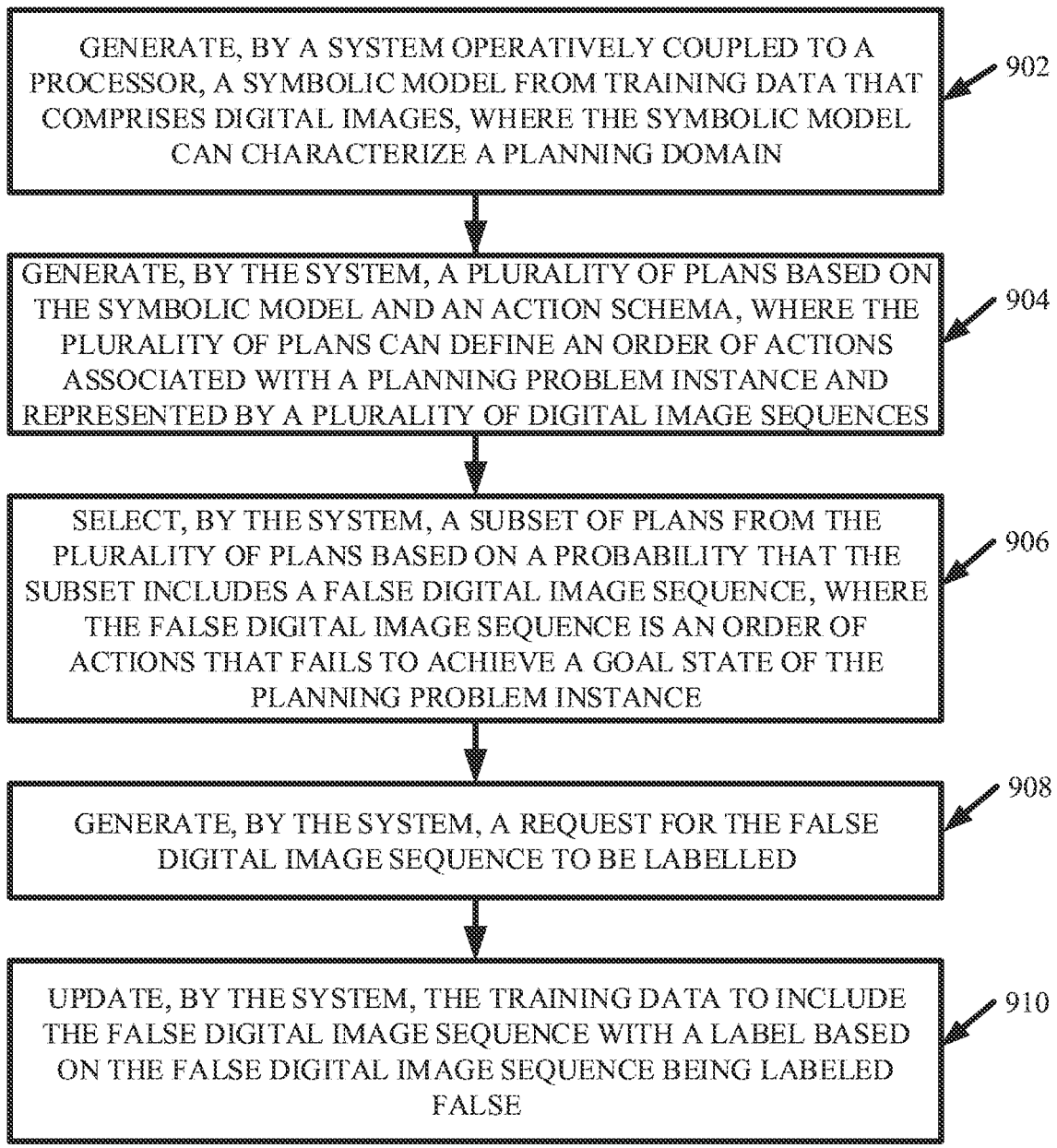
FIG. 9 illustrates a flow diagram of an example, non-limiting computer-implemented method that can facilitate the generation and/or training of one or more symbolic models that can characterize one or more planning domains in accordance with one or more embodiments described herein.

FIG. 9 illustrates a flow diagram of an example, non-limiting computer-implemented method 900 that can facilitate autonomous generation and/or training of one or more symbolic models via active machine learning in accordance with one or more embodiments described herein. Repetitive description of like elements employed in other embodiments described herein is omitted for sake of brevity.

At 902, the computer-implemented method 900 can comprise generating (e.g., via model generator component 202), by a system 100 operatively coupled to a processor 120, one or more symbolic models from training data (e.g., audio-visual data 122) that comprises digital images, where the one or more symbolic models can characterize a planning domain. For example, the one or more symbolic models can characterize pairs of digital images as tuples with tertiary values that describe successorship in accordance with the various embodiments described herein. In various embodiments, one or more semi-supervised classifications, such as a PNU classification, can be employed to train one or more classifiers of the one or more symbolic models.

At 904, the computer-implemented method 900 can comprise generating (e.g., via plan generator component 302), by a system 100 operatively coupled to a processor 120, a plurality of plans based on the one or more symbolic models and symbolic action schema (e.g., retrieved from one or more training data repositories 108, such as text-based data 124), where the plurality of plans can define an order of actions associated with a planning problem instance and represented by a plurality of digital image sequences. For example, the plan generator component 302 can employ one or more domain-independent planners to generate the plurality of plans. As exemplified in FIG. 4, the plans can represent initial state, intermediate states, and/or goal state of a planning problem instance via digital images. Thereby, an order of actions can be represented by one or more digital image sequences.

At 906, the computer-implemented method 900 can comprise selecting (e.g., via plan selector component 502), by the system 100, a subset of plans from the plurality of plans based on a probability that the subset includes one or more false digital image sequences, where the one or more false digital image sequences can characterize an order of actions that fails to achieve a goal state of the planning problem instance. In various embodiments, the subset of plans can include plans generated at 904 that have a probability of including one or more inaccuracies that is greater than a defined threshold. For example, the subset of plans can include plans that have a high likelihood of one or more inaccurate orders of actions to achieve the goal state.

At 908, the computer-implemented method 900 can comprise generating (e.g., via plan selector component 502), by the system 100, one or more requests for the false digital image sequence to be labeled. For example, the one or more requests generated at 908 can be a part of an active machine learning protocol, where one or more users can be queried via the requests to evaluate the subset of plans generated at 906. In various embodiments, the one or more users can identify and label one or more false digital image sequences within the subset of plans; thereby unlabeled data samples generated via the one or more symbolic models can be labeled as positive or negative data samples.

At 910, the computer-implemented method 900 can comprise updating (e.g., via update component 602), by the system 100, the training data to include the false digital image sequence with a label based on the false digital image sequence being labeled false. For example, the update can populate one or more training datasets with digital image sequences identified and/or labeled as false by the one or more users. Thereby, the update component 602 can populate the training data with negative data examples. The model generator component 202 can be further trained on the negative data examples to enhance the accuracy of one or more symbolic models generated by the model generator component 202.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
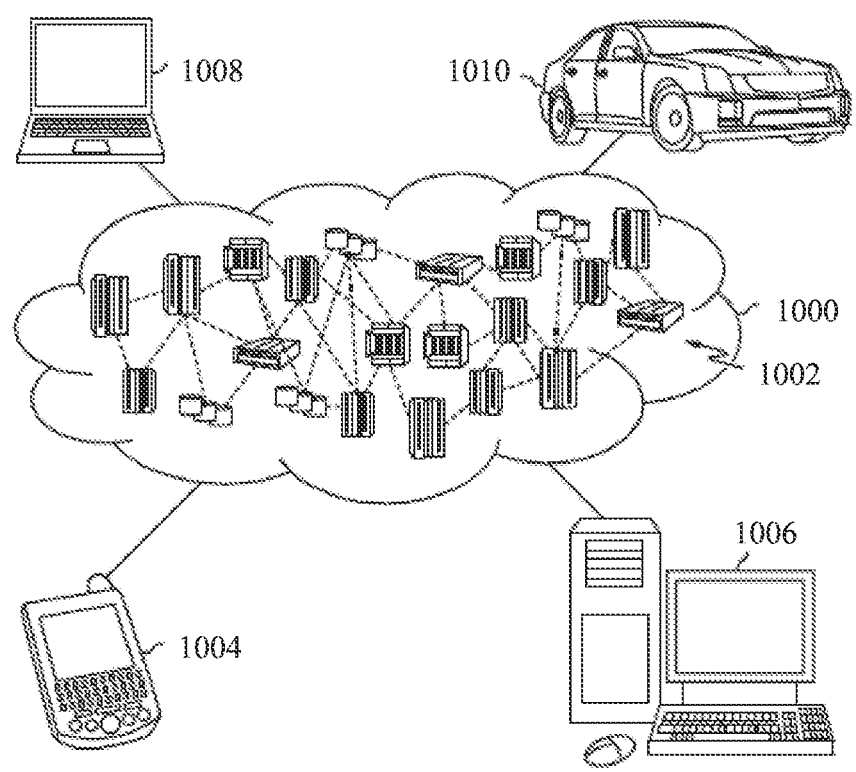
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
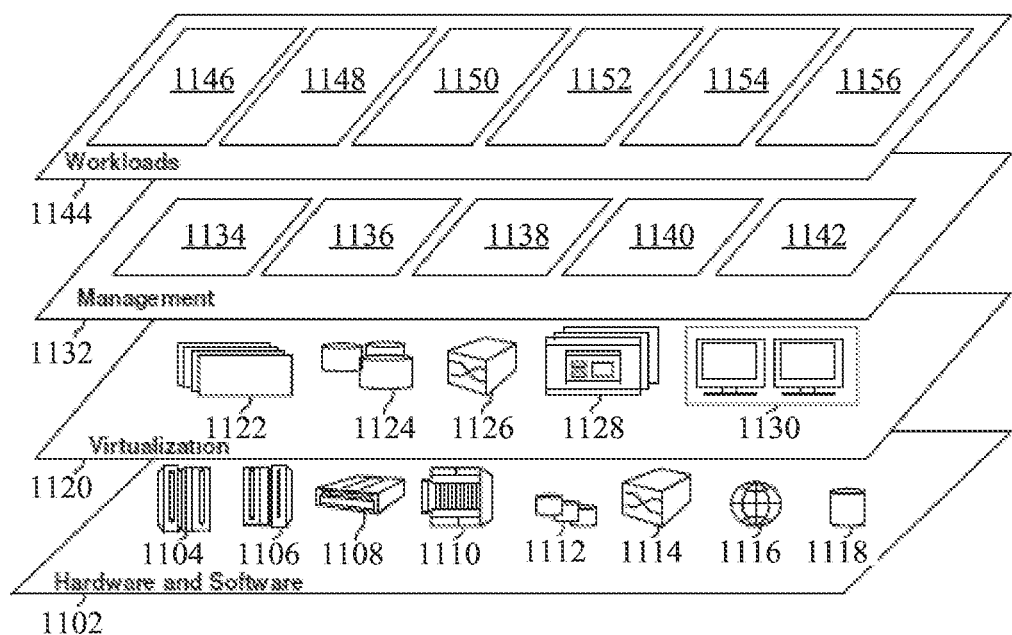
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and AI planning 1156. Various embodiments of the present invention can utilize the cloud computing environment described with reference to FIGS. 10 and 11 to facilitate active machine learning and/or train one or more symbolic models that characterize one or more planning domains via a plurality of digital image sequences.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
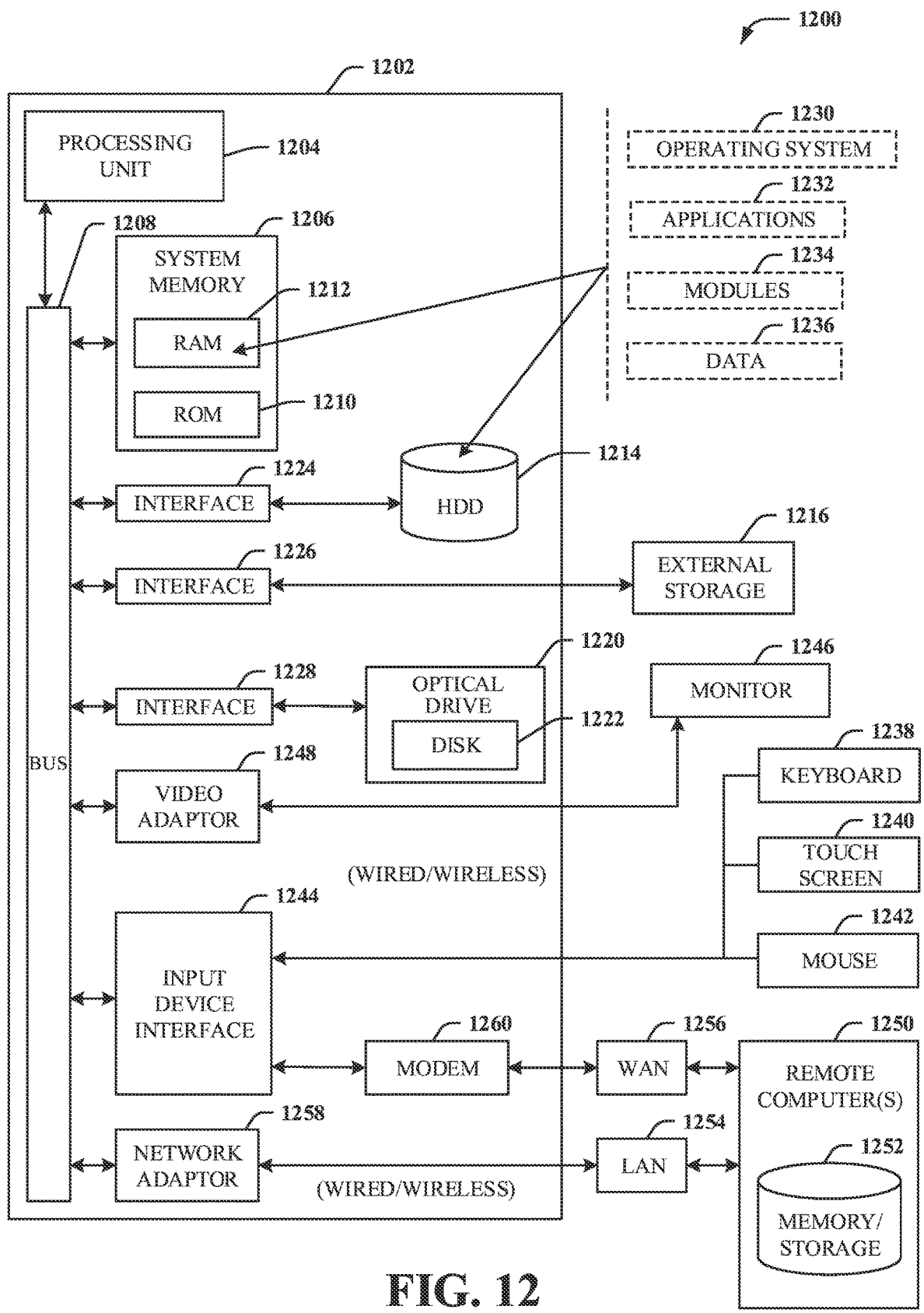
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, etc.) and an optical disk drive 1220 (e.g., which can read or write from a disk 1222, such as a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes at least one of the computer executable components that:
trains, via active learning, using a set of training data comprising digital images and plans, a machine learning model to generate symbolic models that characterize the plans as digital image sequences;
based on feedback received regarding accuracy the symbolic models, generates additional training data comprising negative data samples, wherein the negative data samples comprise false digital image sequences;
adds the additional training data to the set of training data; and
retrains, via the active learning, using the set of training data, the machine learning model, to generate the symbolic models that characterize the plans as the digital image sequences.

2. The system of claim 1, wherein a digital image sequence characterize an order of actions, and wherein the set of training data comprises positive data samples comprising true digital image sequences that succeed at achieving respective goal states associated with corresponding plans.

3. The system of claim 2, wherein a false digital image sequence comprises an order of actions that fails to achieve a goal state associated with a corresponding plan.

4. The system of claim 3, wherein the at least one of the computer executable components further:
determines a probability that a target digital image sequence from the digital image sequences is a true digital image sequence based on identification of the false digital image sequence.

5. The system of claim 1, wherein the at least one of the computer executable components further:
generates a subset of the plans based on an action schema and an initial state represented by a digital image from the set of training data, wherein the subset of the plans define respective orders of actions.

6. The system of claim 5, wherein the generating employs a domain-independent planner to generate the subset of the plans.

7. The system of claim 1, wherein the at least one of the computer executable components further:
selects a subset of plans from the plans based on a probability that the subset of plans includes a false digital image sequence.

8. The system of claim 7, wherein the at least one of the computer executable components further generates a request for the false digital image sequence to be labelled.

9. The system of claim 8, wherein at least one of the computer executable components further:
updates the set of training data to include the false digital image sequence with a label based on the false digital image sequence being labelled false.

10. A computer-implemented method, comprising:
training, by a system operatively coupled to a processor, via active learning, using a set of training data comprising digital images and plans, a machine learning model to generate symbolic models that characterize the plans as digital image sequences;
based on feedback received regarding accuracy the symbolic models, generating, by the system, additional training data comprising negative data samples, wherein the negative data samples comprise false digital image sequences;
adding, by the system, the additional training data to the set of training data; and
retraining, by the system, via the active learning, using the set of training data, the machine learning model, to generate the symbolic models that characterize the plans as the digital image sequences.

11. The computer-implemented method of claim 10, wherein a digital image sequence characterize an order of actions, and wherein the set of training data comprises positive data samples comprising true digital image sequences that succeed at achieving respective goal states associated with corresponding plans and wherein the false digital image sequence comprises an order of actions that fails to achieve a goal state associated with a corresponding plan.

12. The computer-implemented method of claim 10, further comprising:
generating, by the system, a subset of the plans based on an action schema and an initial state represented by a digital image from the set of training data, wherein the subset of the plans define respective orders of actions.

13. The computer-implemented method of claim 10, further comprising:
selecting, by the system, a subset of plans from the plans based on a probability that the subset of plans includes a false digital image sequence.

14. The computer-implemented method of claim 13, further comprising:
generating, by the system, a request for the false digital image sequence to be labelled.

15. The computer-implemented method of claim 14, further comprising:
updating, by the system, the set of training data to include the false digital image sequence with a label based on the false digital image sequence being labelled false.

16. A computer program product for enhancing an accuracy of symbolic models, the computer program product comprising a computer readable storage medium having program instructions embodied therewith, the program instructions executable by a processor to cause the processor to:
train, via active learning, using a set of training data comprising digital images and plans, a machine learning model to generate symbolic models that characterize the plans as digital image sequences;
based on feedback received regarding accuracy the symbolic models, generate additional training data comprising negative data samples, wherein the negative data samples comprise false digital image sequences;
add the additional training data to the set of training data; and
retrain, via the active learning, using the set of training data, the machine learning model, to generate the symbolic models that characterize the plans as the digital image sequences.

17. The computer program product of claim 16, wherein a digital image sequence characterize an order of actions, and wherein the set of training data comprises positive data samples comprising true digital image sequences that succeed at achieving respective goal states associated with corresponding plans and wherein the false digital image sequence comprises an order of actions that fails to achieve a goal state associated with a corresponding plan.

18. The computer program product of claim 17, wherein the program instructions further cause the processor to:
generate a subset of the plans based on an action schema and an initial state represented by a digital image from the set of training data, wherein the subset of the plans define respective orders of actions.

19. The computer program product of claim 17, wherein the program instructions further cause the processor to:
select a subset of plans from the plans based on a probability that the subset of plans includes a false digital image sequence.

20. The computer program product of claim 19, wherein the program instructions further cause the processor to:
generate a request for the false digital image sequence to be labelled; and
update the set of training data to include the false digital image sequence with a label based on the false digital image sequence being labelled false;
training, by a system operatively coupled to a processor, via active learning, using a set of training data comprising digital images and plans, a machine learning model to generate symbolic models that characterize the plans as digital image sequences;
based on feedback received regarding accuracy the symbolic models, generating, by the system, additional training data comprising negative data samples, wherein the negative data samples comprise false digital image sequences;
adding, by the system, the additional training data to the set of training data; and
retraining, by the system, via the active learning, using the set of training data, the machine learning model, to generate the symbolic models that characterize the plans as the digital image sequences.

\* \* \* \* \*